United States Patent
Moon et al.

(10) Patent No.: US 7,347,102 B2
(45) Date of Patent: Mar. 25, 2008

(54) CONTACT-TYPE ELECTRIC CAPACITIVE DISPLACEMENT SENSOR

(75) Inventors: Wonkyu Moon, Kyungsangbuk-do (KR); Moojin Kim, Kyungsangbuk-do (KR)

(73) Assignees: Postech Foundation, Kyungasangbuk-Do (KR); Postech Academy-Industry Foundation, Kyungasangbuk-do (KR)

( * ) Notice: Subject to any disclaimer, the term of this patent is extended or adjusted under 35 U.S.C. 154(b) by 92 days.

(21) Appl. No.: 11/200,091

(22) Filed: Aug. 10, 2005

(65) Prior Publication Data

US 2007/0034013 A1    Feb. 15, 2007

(51) Int. Cl.
  *G01B 7/16*    (2006.01)
  *G01L 1/00*    (2006.01)
(52) U.S. Cl. ........................................ 73/780
(58) Field of Classification Search .................... 73/780
  See application file for complete search history.

(56) References Cited

U.S. PATENT DOCUMENTS

| | | | | |
|---|---|---|---|---|
| 3,808,480 A | * | 4/1974 | Johnston | 361/283.4 |
| 4,961,055 A | * | 10/1990 | Habib et al. | 324/662 |
| 5,644,349 A | * | 7/1997 | Martin | 347/46 |
| 6,829,953 B2 | * | 12/2004 | Ishiguro et al. | 73/862.52 |
| 7,093,498 B2 | * | 8/2006 | Herbert et al. | 73/778 |
| 7,138,808 B2 | * | 11/2006 | Wakamatsu | 324/661 |
| 2003/0223176 A1 | * | 12/2003 | Fujii et al. | 361/277 |

OTHER PUBLICATIONS

Moojin Kim et. al.; *A Micromachined Displacement Sensor with high Accuracy and Long Range*; May 2005; Proc. Of 5th euspen International Conference—Montpellier—France; pp. 157-160.

* cited by examiner

*Primary Examiner*—Michael Cygan
*Assistant Examiner*—Octavia Davis
(74) *Attorney, Agent, or Firm*—Bacon & Thomas, PLLC

(57) ABSTRACT

A contact-type electric capacitive displacement sensor includes a stationary element having a stationary plate, a stationary conductive pattern formed on the stationary plate and an insulation film coated on the stationary plate and a displaceable element having a displaceable plate, a displaceable conductive pattern formed on the displaceable plate and an insulation film coated on the displaceable plate. The stationary and the displaceable conductive patterns have a cyclic pattern of conductor to thereby produce a variation of capacitance therebetween when moving relative to each other.

21 Claims, 4 Drawing Sheets

CONTACT-TYPE ELECTRIC CAPACITIVE DISPLACEMENT SENSOR

FIELD OF THE INVENTION

The present invention relates to a contact-type electric capacitive displacement sensor for measuring a minute linear displacement; and, more particularly, to a contact-type electric capacitive displacement sensor employing an area variation measurement mechanism for detecting a displacement by way of measuring a variation in capacitance corresponding to a variation in an overlapped area of conductive patterns of a stationary element and a displaceable element when they are moved relative to each other in parallel.

BACKGROUND OF THE INVENTION

In general, an electric capacitive displacement sensor is a device for producing an electric signal indicating a variation in capacitance corresponding to a displacement between two conductive plates. When the two conductive plates are disposed to face with each other in parallel, the capacitance therebetween is proportional to a dielectric constant of a medium interposed between the two plates and the areas of the two plates, whereas the capacitance is inversely proportional to a gap between the two plates. That is to say, the electric capacitive displacement sensor measures a displacement based on the principle that capacitance is varied when there exists a variation in the distance or overlapped area between the two plates as the two plates are moved relative to each other.

Electric capacitive displacement sensors can be classified into two types depending on their measurement methods: one type is to detect a variation in a gap between two facing plates in a vertical direction when they are moved relative to each other; and the other type is to detect a variation in an overlapped area when two facing plates are moved relative to each other in parallel (see, "Capacitive sensors", Chapter three, Baxter, IEEE, 1997).

So far, the method using a variation in a gap (a space) between two facing plates has been preferred to measure a minute displacement since the method has an advantage in that it exhibits a high sensitivity to a displacement with a relatively simple structure. However, this method has a disadvantage in that it has a very limited measurement range for displacement since its sensitivity rapidly decreases non-linearly as the displacement increases. Further, the gap (space) variation measurement method is very sensitive to a mechanical installation error, so extreme care must be taken for the installation of the displacement sensor. In particular, in this method, the reliability of measurement may be greatly reduced due to an abbe error, a cosine error and the like that can be caused by a discrepancy between a driving direction (e.g., a horizontal direction) and a measurement direction (e.g., a vertical direction). Also, the method is also disadvantageous with regard to effective space utilization.

Meanwhile, a non-contact type electric capacitive displacement sensor has been widely employed for a measurement of a displacement since it is not accompanied by mechanical abrasion and it can keep up with a fast driving velocity.

Recently, however, as a super-microscopic and super-precise measurement of displacement is demanded using an atomic microscope or a nano driving system, requirements for a displacement sensor has been changed. Specifically, a condition for velocity has been eased considerably, and also a mechanical installation error rather than an electric noise has risen as an important issue to be solved. As the environment in which the displacement sensor is used changes greatly, there no longer exists a necessity for an exclusive use of a non-contact type sensor.

SUMMARY OF THE INVENTION

It is, therefore, a primary object of the present invention to provide a contact-type electric capacitive displacement sensor employing an area variation measurement method, capable of reducing a mechanical installation error and an error that might be caused by a discrepancy between a driving direction and a measurement direction.

It is another object of the present invention to provide a contact-type electric capacitive displacement sensor employing an area variation measurement method, capable of measuring a displacement in a wide range and saving an installation space by way of making a driving direction and a measurement direction coincident with each other.

In accordance with a preferred embodiment of the present invention, there is provided a contact-type electric capacitive displacement sensor, which includes: a stationary element including a stationary plate and a stationary conductive pattern formed on the stationary plate, wherein the stationary conductive pattern has one or more stationary conductors distanced away from each other; a displaceable element including a displaceable plate and a displaceable conductive pattern formed on the displaceable plate, the displaceable element and the stationary element being contacted with each other and movable relative to each other, wherein the displaceable conductive pattern has at least one displaceable conductor; a voltage source for supplying an electric power to the sensor; and signal detector means for detecting a variation of capacitance between the stationary and the displaceable elements, wherein each of the stationary and the displaceable elements has an insulation film associated with its corresponding conductive pattern so that the areas overlapped between the respective stationary conductors and the displaceable conductor change to thereby produce the variation of capacitance therebetween when moving relative to each other.

In accordance with another preferred embodiment of the present invention, there is provided a contact-type electric capacitive displacement sensor, which includes: a stationary element including a stationary plate and a stationary conductive pattern formed on the stationary plate; a displaceable element including a displaceable plate and a displaceable conductive pattern formed on the displaceable plate, the stationary and the displaceable elements being contacted with each other and movable relative to each other, wherein the stationary and the displaceable conductive patterns include conductors having cyclic patterns, respectively; a voltage source for supplying an electric power to the sensor; and signal detector means for detecting a variation of capacitance between the stationary and the displaceable elements, wherein each of the stationary and the displaceable elements has an insulation film associated with its corresponding conductive pattern so that the area overlapped between the stationary and the displaceable conductors change to periodically produce the variation of capacitance therebetween when moving relative to each other.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
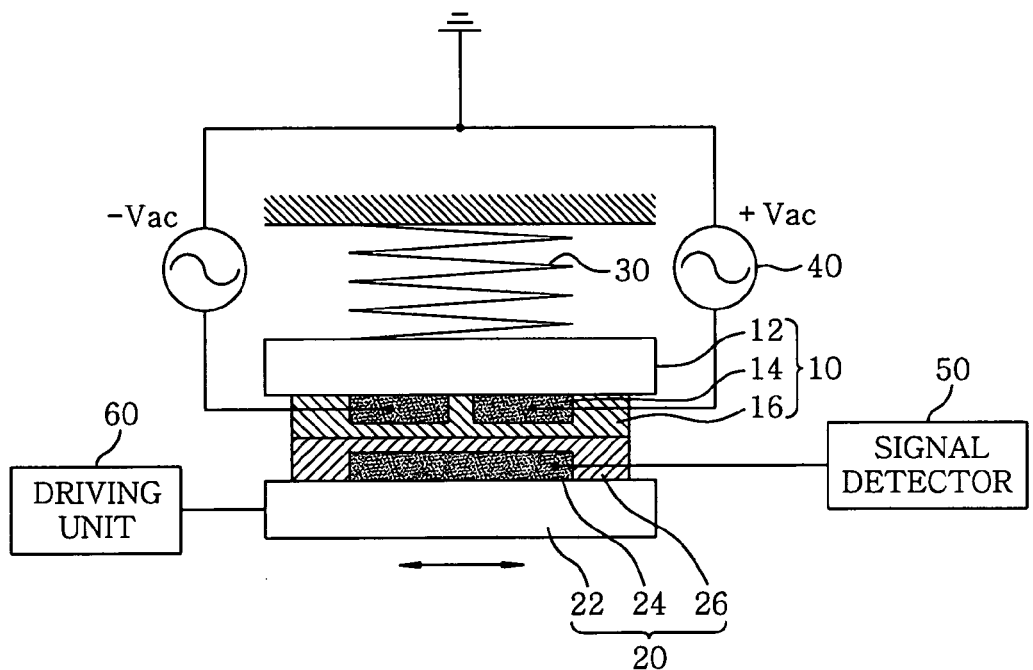
FIG. 1 is a schematic view of a contact-type electric capacitive displacement sensor in accordance with a first preferred embodiment of the present invention.

Hereinafter, preferred embodiments of the present invention will be described in detail with reference to the accompanying drawings. In the drawings, the same or similar elements are denoted by the same reference numerals even though they are depicted in different drawings.

FIG. 1 is a schematic view of a contact-type electric capacitive displacement sensor in accordance with a first preferred embodiment of the present invention.

As shown in FIG. 1, the contact-type electric capacitive displacement sensor includes a stationary element 10 and a displaceable element 20. The stationary element 10 has a stationary plate 12, a stationary conductive pattern (or a stationary electrode pattern) 14 formed on the stationary plate 12, and a stationary insulation film 16 uniformly coated over the stationary plate 12 to cover the conductive pattern 14. Likewise, the displaceable element 20 has a displaceable plate 22, a displaceable conductive pattern (or a displaceable electrode pattern) 24 formed on the displaceable plate 22, and a displaceable insulation film 26 uniformly coated over the displaceable plate 22 to cover the conductive pattern 24.

The insulation films 16 and 26 in the stationary element 10 and the replaceable element 26 are coated very thin, i.e., just thick enough to prevent an electric conductance between the stationary element 10 and the displaceable element 20, respectively. The insulation films 16 and 26 need to be formed of a material that has a low coefficient of friction and is highly resistant to abrasion. Further, it is preferred that the material for the insulation films 16 and 26 needs to have a high dielectric constant, to thereby improve the sensitivity of the displacement sensor. The insulation films 16 and 26 are made from a material of Diamond-like Carbon (DLC) such as a hydrogenated amorphous carbon (a-C:H, $C_6H_6$) or a material of a polymer of fluoride and ethylene such as PTFE (polytetrafluoroethylene) using CVD method. Moreover, a lubricant may be coated on the insulation films 16 and 26 to further reduce friction and abrasion therebetween.

The stationary element 10 and the displaceable element 20 are disposed such that their insulation films 16 and 26 are contacted with each other with being face-to-face with each other. The area contacted between the stationary and the displaceable conductive patterns 14 and 24 with the insulation films disposed therebetween serve to produce electric field. Further, the displaceable element 20 is made to slide relative to the stationary element 10 by a driving unit 60 in parallel (e.g., in a driving direction as indicated by an arrow), so that an overlapped area therebetween is changed, thus generating a variation in capacitance.

Further, the contact-type electric capacitive displacement sensor further includes an elastic member 30, an AC power source 40 and a signal detector 50.

The elastic member 30 such as a spring has one end supported by a support (not shown) and another end connected to the stationary element 10. The elastic spring 30 serves to provide a force to bias the stationary element 10 toward the displaceable element 20 in a direction perpendicular to a driving direction such that the stationary element 30 and the displaceable element 20 are always in firm contact with each other. Therefore, it is possible to prevent the generation of a displacement error that might be caused in a direction perpendicular to a movement of the displaceable element 20 when the displaceable element 20 is driven by the driving unit 60 relative to the stationary element 10 in parallel. Further, the elastic spring 30 also absorbs a vibration transmitted thereto while the displaceable element 20 is being moved.

The AC power source 40 supplies an AC power to the conductive patterns 14 of the stationary element 10. The AC power from the AC power source 40 needs to be supplied sufficiently such that an electric signal may be outputted when a displacement of the replaceable element 20 occurs. In the present invention, it an AC power source is preferred to a DC power source because it is difficult to configure the signal detector 50 and to achieve the performance of the signal detector 50 in case of being implemented with a DC power source.

The signal detector 50 is connected to the conductive pattern 24 of the displaceable element 20 to which no power is supplied from the AC power source 40 to detect the variation in the capacitance between the stationary element 10 and the displaceable element 20. The signal detector 50 detects a variation in the capacitance between the stationary element 10 and the displaceable element 20 corresponding to the displacement of the displaceable element 20 driven by the driving unit 60 and then outputs the variation in the capacitance as an electric signal. Specifically, the variation in the capacitance can be outputted as a variation in various electric signals, such as a variation in the amplitude of a voltage or a current and a variation in frequency. Further, in order to facilitate the investigation of the electric signal, the signal detector 50 can be configured to include various electrical devices for performing amplification, filtering, modulation/demodulation of a signal, and so forth.

In the preferred embodiment of the present invention, though there has been shown and described that the spring 30 and the AC power source 40 are connected to the stationary element 10, it is also possible to connect them to the replaceable element 20. In such a case, the signal detector 50 should be coupled to the stationary element 10.

Further, it is understood that the insulation film may be applied to anyone of the stationary and the displaceable elements or both of the stationary and the displaceable elements.

The contact-type electric capacitive displacement sensor with the above conFiguration according to the first embodiment of the present invention employs an area variation measurement mechanism. Specifically, the displacement sensor according to the present invention measures a variation in capacitance corresponding to a variation in an overlapped area between the conductive patterns 14 and 24 in the stationary element 10 and the displaceable element 20 when they are moved relative to each other in parallel while being in firm contact with each other via the insulation films 16 and 26. Then, the displacement sensor outputs the detected capacitance variation as an electric signal, thus allowing a user to confirm the displacement.

To be more specific, if the driving unit 60 is operated while an AC power is applied to the conductive patterns 14 of the stationary element 10, the displaceable element 20 is moved in parallel with the stationary element 10. As the displaceable element 20 is moved relative to the stationary element 10 in parallel, the overlapped area between the conductive patterns 14 and 24 in the stationary element 10 and the displaceable element 20 is changed, so that capacitance therebetween also changes. The variation in the capacitance between the stationary element 10 and the displaceable element 20 is detected by the signal detector 50 connected to the conductive pattern 24 in the displaceable element 20 to which no power is applied from the AC power source 40 and, then, is outputted as an electric signal.

Thus outputted electric signal is converted into a recognizable value by, for example a microprocessor (not shown) connected to the signal detector 50 and then is displayed to allow a user to confirm the displacement.

As for the contact-type electric capacitive displacement sensor employing the area variation measurement mechanism described above, the insulation films 16 and 26 are formed of a material with a high dielectric constant, and also formed to be very thin in a uniform thickness such that the stationary element 10 and the displaceable element 20 are maintained as close to each other as possible. As a consequence, the sensitivity of the displacement sensor can be improved, whereby a minute displacement can be measured with a high precision.

Referring back to FIG. 1, the conductive pattern 14 in the stationary element 10 has two pieces of stationary conductors (or stationary electrodes) spaced from each other, while the conductive pattern 24 in the displaceable element 20 has a single piece of a displaceable conductor (or a displaceable electrode). Thus, as the displaceable element 20 is moved relative to the stationary element 10, the areas overlapped between the respective stationary conductors 14 and the displaceable conductor 24 are changed, which entails the variation of the capacitances therebetween. More specifically, the overlapped area of a first (e.g., a left-side) stationary conductor with the displaceable conductor 24 increases to thereby get an increase in its capacitance, while the overlapped area of a second (e.g., a right-side) stationary conductor is reduced to thereby get a reduction in its capacitance. These changes in capacitances are detected by the signal detector 50.

Alternatively, only one conductor may be formed on each of the stationary element 10 and the displaceable element 20.

Figure 2:
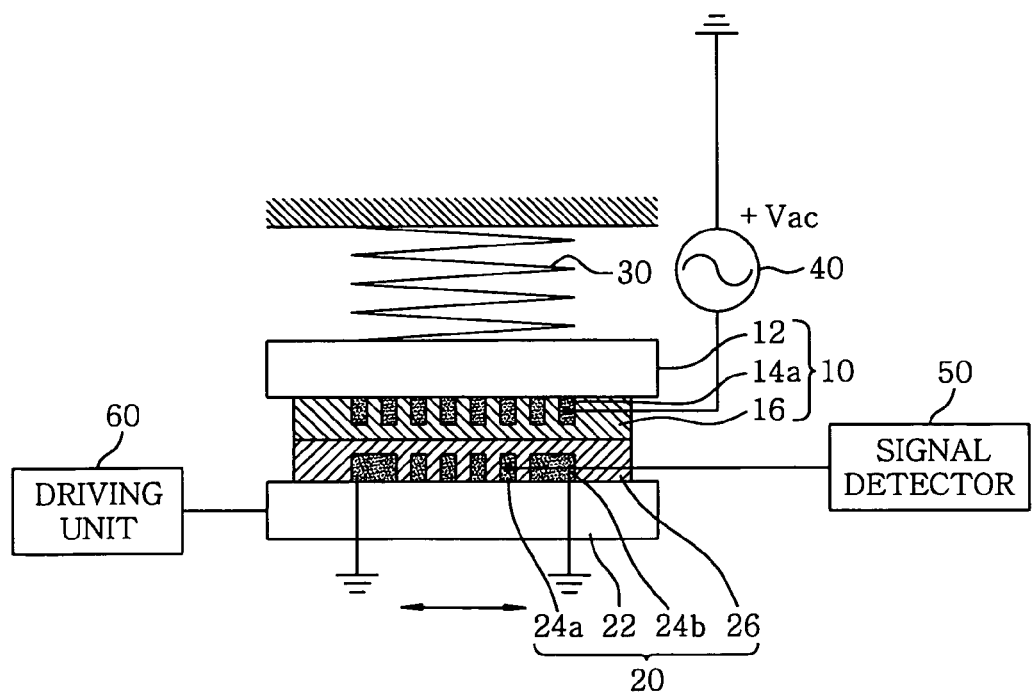
FIG. 2 shows a schematic view of a contact-type electric capacitive displacement sensor in accordance with a second preferred embodiment of the present invention.
Figure 5:
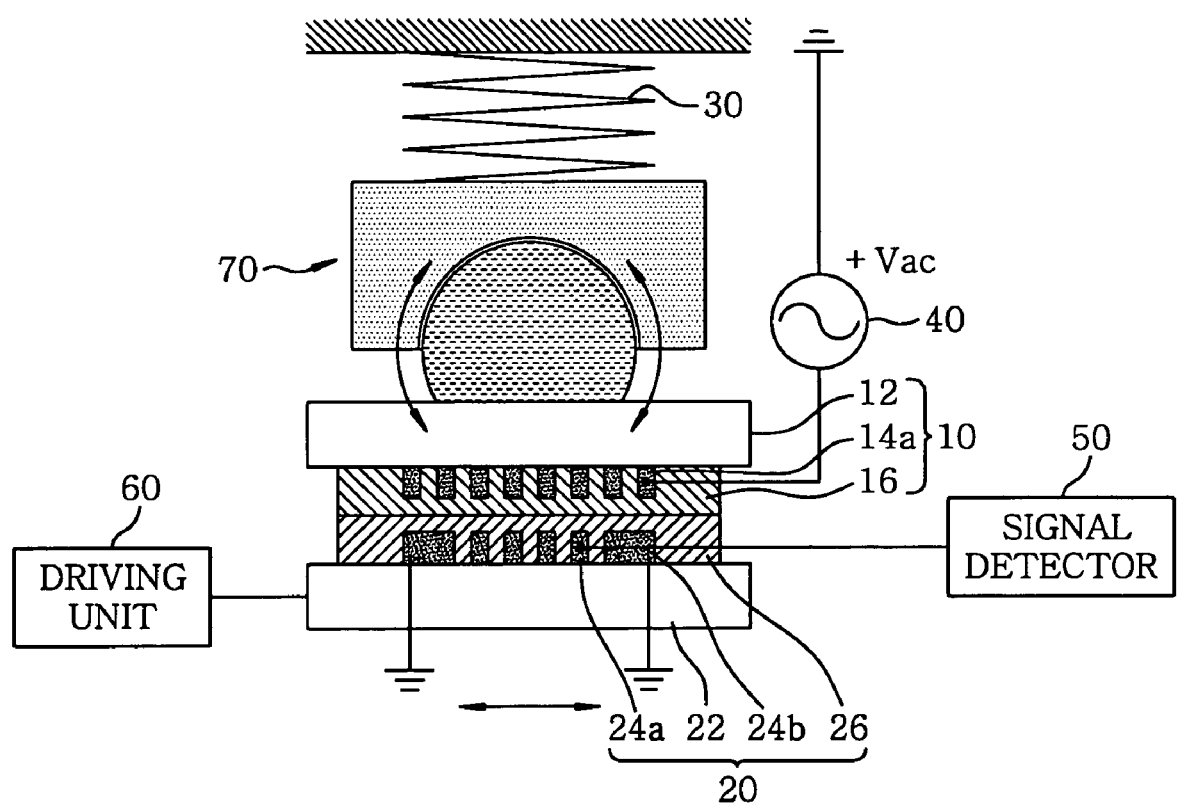
FIG. 5 provides a schematic view of another modified example of the present invention wherein a contact-type electric capacitive displacement sensor has a ball-and-socket joint assembly.

Referring to FIG. 2, there is provided a schematic view of a contact-type electric capacitive displacement sensor in accordance with a second preferred embodiment of the present invention. The capacitive displacement sensor shown in FIG. 5 is identical to that shown in FIG. 1 excepting of a configuration of conductive patterns in the stationary and the displaceable elements, and therefore a detailed description for the remaining elements will be omitted for the sake of simplicity.

As shown in FIG. 2, the conductive patterns in a stationary element 10 and a displaceable element 20 have cyclic patterns in which same shapes appear repeatedly, respectively. For example, as shown in FIGS. 3 and 4, it can be seen that zigzag patterns 14a and 24a are formed in the stationary element 10 and the displaceable element 20, respectively. The period of repetition of the cyclic pattern is preferable as low as several hundred of micrometers or less because of improving the resolution and the sensitivity of the contact-type capacitive displacement sensor. By using the cyclic conductive patterns 14a and 24a, the capacitance between the stationary element 10 and the displaceable element 20 is changed periodically as the displaceable element 20 is moved. Accordingly, by measuring a minute displacement within one cycle and counting the number of repeated cycles, measurement of displacements in a wide range can be carried out stably. Here, the range of displacement that can be measured by using the cyclic patterns is expanded as the number of the cyclic patterns increases.

Figure 3A:
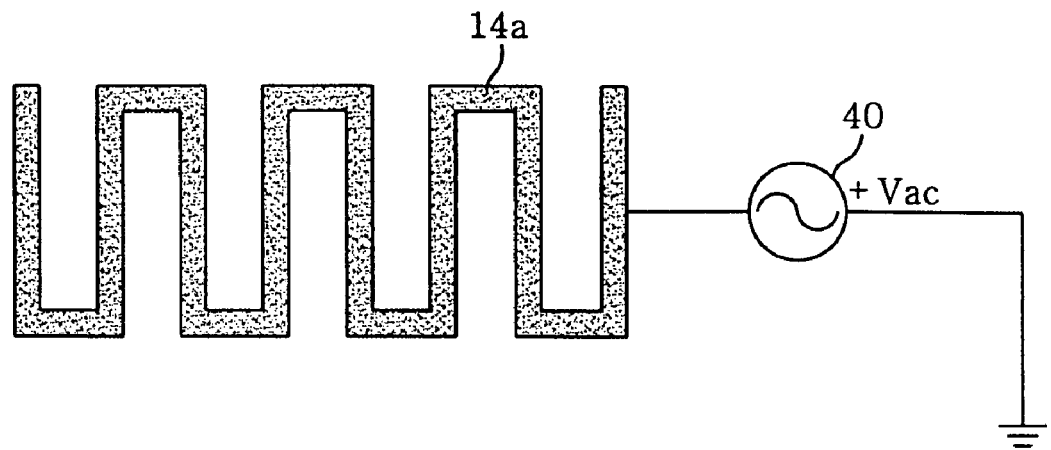
FIGS. 3A and 3B present plan views of a conductive pattern of the stationary and the displaceable elements shown in FIG. 2, respectively.
Figure 3B:
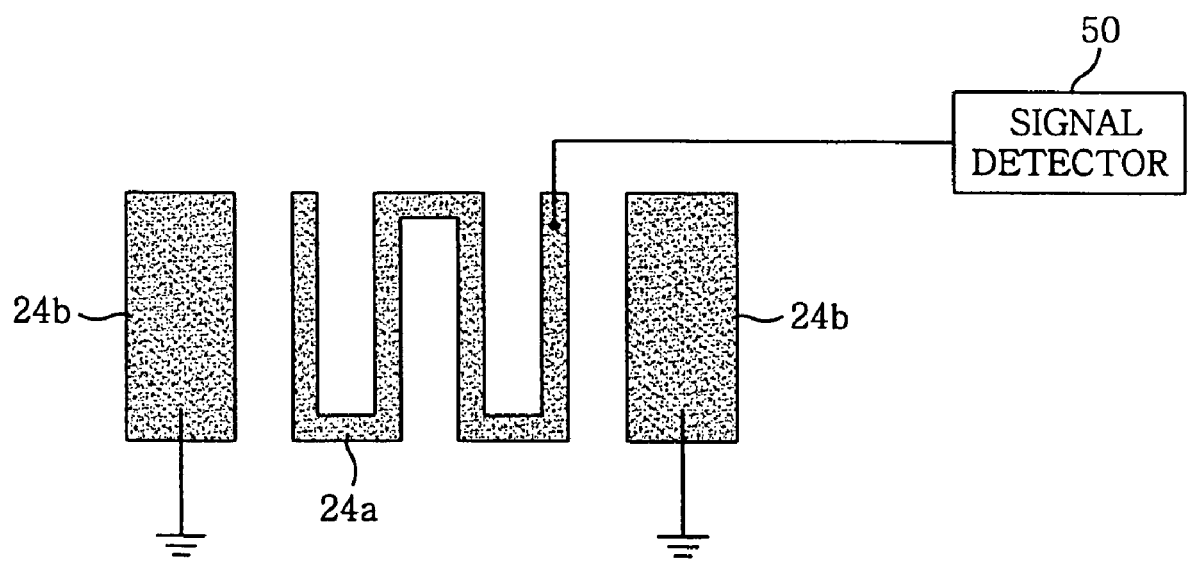

FIG. 3A is a top view of the conductive pattern on the stationary plate 12 shown in FIG. 2, and FIG. 3B is a top view of the conductive pattern on the displaceable plate 20 shown in FIG. 2.

The conductive pattern shown in FIG. 3A has a single zigzag conductor 14a, and the conductive pattern shown in FIG. 3B has three pieces of conductors 24a and 24b. A conductor 24a in the middle part has a zigzag shape which is shorter in length than the zigzag conductor 14a. The zigzag conductor 24a generates a signal indicating a variation in capacitance caused by a variation in its area overlapped with the zigzag conductor 14a. The signal on the zigzag conductor 24a is transmitted to the signal detector 50. Further, a pair of conductors 24b is disposed opposite to each other with the zigzag conductor 24a interposed therebetween via the insulation film 26. The conductors 24b are grounded and serve as shield electrodes to protect the intermediate conductor 24a by excluding any influence from an electric field to be generated at the marginal portions of the zigzag conductor 14a that do not overlap the intermediate zigzag conductor 24a. That is, the presence of the conductors 24b enables a generation of a uniform output signal from the zigzag conductor 24a by way of preventing the zigzag conductor 24a from being affected by the electric field.

Figure 4A:
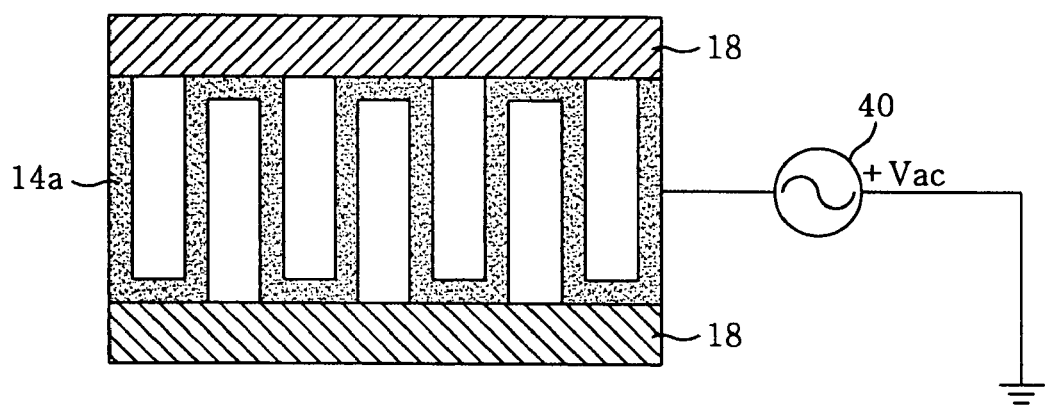
FIGS. 4A and 4B depict a plan view and a perspective view of a modified example adaptable to the embodiments of the present invention, respectively.
Figure 4B:
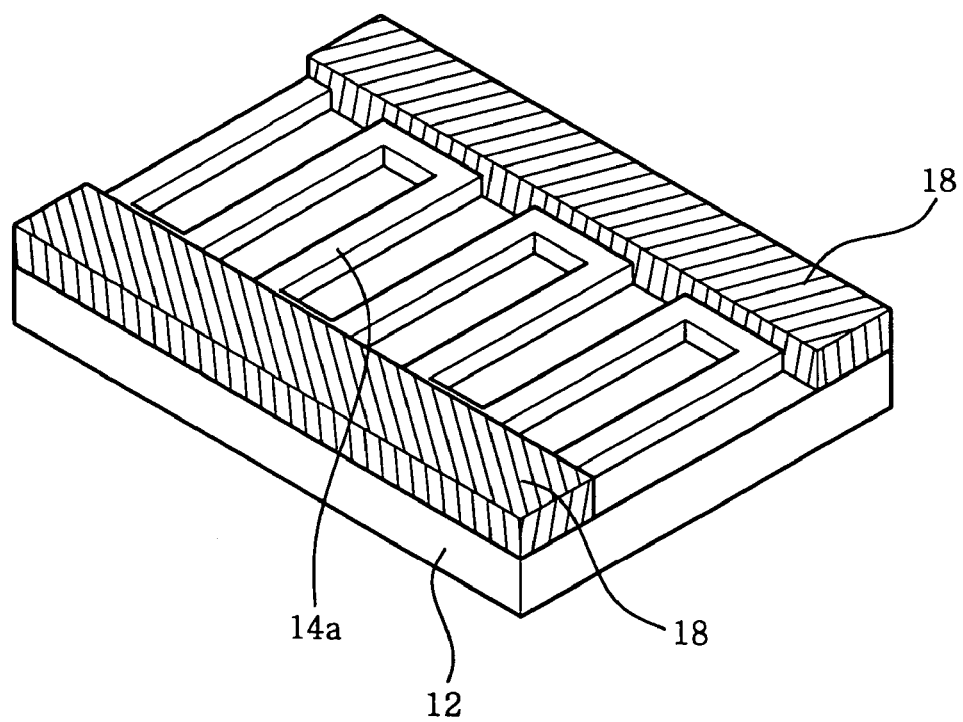

FIGS. 4A and 4B depict a plan view and a perspective view of a modified example adaptable to the embodiments of the present invention illustrated in FIGS. 1 and 2, respectively. In this regard, although the modified example is depicted with respect to only the stationary element, it is understood that the modified example is applicable to the displaceable element as well as the stationary element and in turn all the embodiments of the present invention.

In the first embodiment of the present invention as illustrated in FIG. 1, the insulation films 16 and 26 are applied on the conductive patterns 14 and 24 of the stationary plate 12 and the displaceable plate 22, respectively. Alternatively, in the modified example, as can be seen from FIG. 4A (and FIG. 4B), an insulation film 18 is arranged on the stationary plate 12 (and the displaceable plate 22), except areas on which the stationary conductive pattern (and the displaceable conductive pattern) is formed, e.g., at its both sides along the relative movable direction on the edges of the stationary conductive pattern (and the displaceable conductive pattern). Such an insulation film 18 has a height higher than that of the conductive pattern and serves as a guide or a spacer that would not allow a direct contact between the stationary and the displaceable elements. The configuration shown in FIGS. 4A and 4B have advantages in that the conductive patterns are prevented from being deformed during the deposition of the insulation films on the conductive patterns and from being broken due to contaminants which may be unintentionally introduced between the stationary and displaceable elements.

Referring to FIG. 5, there is shown a schematic view of the contact-type electric capacitive displacement sensor having a ball-and-socket joint assembly in accordance with a modified embodiment of the present invention.

The capacitive displacement sensor shown in FIG. 5 is identical to that shown in FIG. 2 except that it is further provided with a ball-and-socket joint assembly 70 between an elastic member 30 and a stationary element 10, and therefore a detailed description for the remaining elements will be omitted for the sake of simplicity.

The ball-and-socket joint assembly 70 allows the stationary element 10 to swing relative to the displaceable element 20 when moving the displaceable element 20. Therefore, even in case the moving direction of the displaceable element 20 is not in parallel with the stationary element 10, the stationary element 10 can be brought into a firm contact with the displaceable element 20.

Without the ball-and-socket joint assembly 52, a displacement error caused in a movement other than a horizontal movement of the displaceable element 20 can be induced in a measured value and, even worse, the displacement sensor itself may be broken.

Here, a tilting stage may be used instead of the ball-and-socket joint assembly. Further, the ball-and-socket joint assembly 70 can be provided at either of the stationary element 10 or the displaceable element 20 to be integral therewith or independent therefrom.

As described above, the contact-type electric capacitive displacement sensor in accordance with the present invention can reduce a mechanical installation error and an error that might be caused by a discrepancy between a driving direction and a measurement direction. Further, since a displacement error in a direction other than the driving direction can be prevented, the reliability of measurement can be improved. Moreover, since the driving direction and the measurement direction are same, the space necessary to install the displacement sensor can be reduced, and measurement of displacements can be carried out stably in a wider range, including a minute displacement. Consequently, the overall performance of the displacement sensor can be improved considerably.

While the invention has been shown and descried with respect to the preferred embodiments, it will be understood by those skilled in the art that various changes and modification may be made without departing from the spirit and scope of the invention as defined in the following claims.

What is claimed is:

1. A contact-type electric capacitive displacement sensor comprising:
    a stationary element including a stationary plate and a stationary conductive pattern formed on the stationary plate, wherein the stationary conductive pattern has one or more stationary conductors distanced away from each other;
    a displaceable element including a displaceable plate and a displaceable conductive pattern formed on the displaceable plate, wherein the displaceable conductive pattern has at least one displaceable conductor;
    a voltage source for supplying an electric power to the sensor; and
    signal detector means for detecting a variation of capacitance between the stationary and the displaceable elements, wherein each of the stationary and the displaceable elements has an insulation film associated with its corresponding conductive pattern, and the displaceable element and the stationary element are contacted with each other through the insulation films and movable relative to each other, so that the areas overlapped between the respective stationary conductors and the displaceable conductor change to thereby produce the variation of capacitance therebetween when moving relative to each other.

2. The sensor of claim 1, further comprising an elastic spring for urging the stationary element toward the displaceable element to make the stationary element and the displaceable element be in firm contact with each other.

3. The sensor of claim 2, further comprising swing means for allowing the stationary element to swing relative to the displaceable element.

4. The sensor of claim 1, the insulation film is coated on any one of the stationary and the displaceable conductive patterns.

5. The sensor of claim 4, wherein the insulation film is made from a material having a low friction coefficient, a high resistant to abrasion and a high dielectric constant.

6. The sensor of claim 5, wherein the material is selected from a group composed of a Diamond-like Carbon (DLC) and a polymer of fluoride and ethylene.

7. The sensor of claim 1, the insulation film is placed on the stationary and the displaceable plates except an area on which the stationary and the displaceable conductive patterns are formed.

8. The sensor of claim 7, wherein the insulation film is made from a material having a low friction coefficient, a high resistant to abrasion and a high dielectric constant.

9. The sensor of claim 8, wherein the material is selected from a group composed of a Diamond-like Carbon (DLC) and a polymer of fluoride and ethylene.

10. A contact-type electric capacitive displacement sensor comprising:
    a stationary element including a stationary plate and a stationary conductive pattern formed on the stationary plate;
    a displaceable element including a displaceable plate and a displaceable conductive pattern formed on the displaceable plate, wherein the stationary and the displaceable conductive patterns include conductors having cyclic patterns, respectively;
    a voltage source for supplying an electric power to the sensor; and
    signal detector means for detecting a variation of capacitance between the stationary and the displaceable elements,
    wherein each of the stationary and the displaceable elements has an insulation film associated with its corresponding conductive pattern, and the displaceable element and the stationary element are contacted with each other through the insulation films and movable relative to each other, so that the area overlapped between the stationary and the displaceable conductors change to periodically produce the variation of capacitance therebetween when moving relative to each other.

11. The sensor of claim 10, further comprising an elastic member for urging the stationary element toward the displaceable element to make the stationary element and the displaceable element be in firm contact with each other.

12. The sensor of claim 10, further comprising swing means for allowing the stationary element to swing relative to the displaceable element.

13. The sensor of claim 10, wherein the cyclic patterns include zigzag patterns.

14. The sensor of claim 10, the insulation film is coated on any one of the stationary and the displaceable conductive patterns.

15. The sensor of claim 14, wherein the insulation film is made from a material having a low friction coefficient, a high resistant to abrasion and a high dielectric constant.

16. The sensor of claim 15, wherein the material is selected from a group composed of a Diamond-like Carbon (DLC) and a polymer of fluoride and ethylene.

17. The sensor of claim 10, the insulation film is placed on the stationary and the displaceable plates except an area on which the stationary and the displaceable conductive patterns are formed.

18. The sensor of claim 17, wherein the insulation film is made from a material having a low friction coefficient, a high resistant to abrasion and a high dielectric constant.

19. The sensor of claim 18, wherein the material is selected from a group composed of a Diamond-like Carbon (DLC) and a polymer of fluoride and ethylene.

20. The sensor of claim 10, wherein the stationary conducive pattern has a series of stationary conductors and the displaceable conductive pattern has a series of displaceable conductors shorter than the series of stationary conductors and a pair of shield conductors, the shield conductors being grounded and disposed at both ends of the displaceable conductors to prevent the displaceable conductors from being affected by an electric field generated at marginal portions of the stationary conductors that do not overlap the displaceable conductors.

21. The sensor of claim 20, wherein each of the stationary and the displaceable conductors has a zigzag pattern.

* * * * *